US012400542B2

(12) United States Patent
Nakashima et al.

(10) Patent No.: US 12,400,542 B2
(45) Date of Patent: Aug. 26, 2025

(54) CONTROL DEVICE, CONTROL METHOD, AND CONTROL PROGRAM

(71) Applicants: HONDA MOTOR CO., LTD., Tokyo (JP); AISIN CORPORATION, Aichi (JP)

(72) Inventors: Hiroyuki Nakashima, Tokyo (JP); Yoji Inui, Kariya (JP); Koki Ueda, Kariya (JP); Kazutaka Hayakawa, Kariya (JP)

(73) Assignees: HONDA MOTOR CO., LTD., Tokyo (JP); AISIN CORPORATION, Kariya (JP)

( * ) Notice: Subject to any disclaimer, the term of this patent is extended or adjusted under 35 U.S.C. 154(b) by 0 days.

(21) Appl. No.: 18/490,876

(22) Filed: Oct. 20, 2023

(65) Prior Publication Data

US 2024/0135815 A1 Apr. 25, 2024
US 2024/0233538 A9 Jul. 11, 2024

(30) Foreign Application Priority Data

Oct. 24, 2022 (JP) ................................ 2022-169836

(51) Int. Cl.
*G08G 1/14* (2006.01)
*B60W 30/06* (2006.01)
(Continued)

(52) U.S. Cl.
CPC ............ *G08G 1/143* (2013.01); *B60W 30/06* (2013.01); *B60W 50/00* (2013.01); (Continued)

(58) Field of Classification Search
CPC ...... G08G 1/143; B60W 30/06; B60W 50/00; B60W 2050/0005; B60W 2420/403; G06V 20/586; B62D 15/027; B62D 15/0285
See application file for complete search history.

(56) References Cited

U.S. PATENT DOCUMENTS

2013/0166190 A1 6/2013 Ikeda et al.
2017/0118307 A1* 4/2017 Beaurepaire ............ H04W 4/40
(Continued)

FOREIGN PATENT DOCUMENTS

DE 10 2013 015 348 A1 4/2014
JP 2020-117128 A 8/2020
(Continued)

OTHER PUBLICATIONS

Extended European Search Report dated Apr. 5, 2024, Application No. EP 23205260.5; 10 pages.
(Continued)

*Primary Examiner* — Daryl C Pope
(74) *Attorney, Agent, or Firm* — Rankin, Hill & Clark LLP

(57) ABSTRACT

A control device includes an outside recognition unit, a parking control unit, and a registration processing unit. When the user selects the parking position, the registration processing unit is configured to detect feature points of the parking position, start a registration process of registering the parking position as the designated parking position, including a verification process for the feature points when the feature point is acquirable, inquire of the user whether a registration for the designated parking position is needed after starting of the verification process, and register the parking position as the designated parking position based on a reply to whether the registration is needed received from the user.

11 Claims, 12 Drawing Sheets

(51) Int. Cl.
*B60W 50/00* (2006.01)
*G06V 20/58* (2022.01)

(52) U.S. Cl.
CPC ... *G06V 20/586* (2022.01); *B60W 2050/0005* (2013.01); *B60W 2420/403* (2013.01)

(56) References Cited

U.S. PATENT DOCUMENTS

| | | | |
|---|---|---|---|
| 2020/0242936 | A1 | 7/2020 | Matsunaga et al. |
| 2021/0107562 | A1 | 4/2021 | Horiguchi et al. |
| 2021/0245734 | A1 | 8/2021 | Harai et al. |

FOREIGN PATENT DOCUMENTS

| | | | |
|---|---|---|---|
| JP | 2021-62685 | A | 4/2021 |
| WO | 2020/022075 | A1 | 1/2020 |

OTHER PUBLICATIONS

Japanese Office Action Corresponding to JP 2022-169836, dated Mar. 25, 2025, 9 pages.

* cited by examiner

CONTROL DEVICE, CONTROL METHOD, AND CONTROL PROGRAM

CROSS-REFERENCE TO RELATED APPLICATIONS

This application is based on and claims priority under 35 USC 119 from Japanese Patent Application No. 2022-169836 filed on Oct. 24, 2022.

TECHNICAL FIELD

The present disclosure relates to a control device, a control method, and a control program.

BACKGROUND ART

In recent years, countermeasures have actively been taken to provide access to sustainable transportation systems considering vulnerable people among traffic participants. Research and development have been focused on further improvement in traffic safety and convenience through research and development for automatic driving technologies.

In the related art, automatic parking control for detecting parking spaces and moving and parking vehicles automatically in the detected parking spaces has been known. Automatic parking control for registering designated parking spaces in advance, detecting the registered parking spaces, and moving and parking vehicles automatically has been also known. JP 2020-117128 A discloses a parking assistance device which acquires feature point information and stores the feature point information in a nonvolatile memory at intervals of a predetermined time while moving toward a desired parking position at which a vehicle is desired to be registered when a user performs a touch operation on a registration process start button of the parking position and then the user drives the vehicle by themselves and performs manual driving parking to move the vehicle toward “the desired parking position at which the vehicle is desired to be registered”.

Incidentally, even when a memory registration process is performed based on a request from the user, feature points cannot be acquired in some cases because of weather, illumination, or the like. Here, in the parking assistance device of JP2020-117128A, the user performs the touch operation on the registration process start button of the parking position when the parking is started. Therefore, despite of a desire for the registration, a situation where the parking position cannot be registered can occur. Accordingly, a scheme of inquiring whether the user requires registration after the feature points can be acquired and registering the parking position when a reply that the registration is needed is received from the user. Incidentally, to register the parking position, it is necessary to verify own position estimation for parking the vehicle of the user at a target parking position based on the acquired feature points and it is necessary to take a predetermined time for the verification. Therefore, after the reply that the registration is needed is received from the user, the user needs to wait for the predetermined time until the registration is completed. However, countermeasures for such point are not described in JP2020-117128A. Accordingly, there is room for improvement for such point in the technology of the related art.

SUMMARY OF INVENTION

An object of the present disclosure is to provide a control device, a control method, and a control program capable of efficiently performing a registration process for a parking position. Accordingly, it is possible to make contribution to development of a sustainable transportation system.

According to an aspect of the present disclosure, a control device for a moving body, the control device including an outside recognition unit configured to acquire recognition data which is a data of an outside of the moving body, a parking control unit configured to perform parking control to park the moving body at a parking position selected by a user of the moving body based on the recognition data, and a registration processing unit configured to register the parking position as a designated parking position, in which when the user selects the parking position, the registration processing unit is configured to detect feature points of the parking position, start a registration process of registering the parking position as the designated parking position, including a verification process for the feature points when the feature point can be acquired, inquire of the user whether a registration for the designated parking position is needed after starting of the verification process, and register the parking position as the designated parking position based on a reply to whether the registration is needed received from the user.

According to another aspect of the present disclosure, there is provided a control method by a control device for a moving body, the control device including an outside recognition unit configured to acquire recognition data which is data of an outisde of the moving body, a parking control unit configured to perform parking control to park the moving body at a parking position selected by a user of the moving body based on the recognition data, and a registration processing unit configured to register the parking position as a designated parking position, in which, when the user selects the parking position, a processor of the control device is configured to: detect feature points of the parking position, start a registration process of registering the parking position as the designated parking position, including a verification process for the feature points when the feature point can be acquired, inquire of the user whether a registration for the designated parking position is needed after starting of the verification process, and register the parking position as the designated parking position based on a reply to whether the registration is needed received from the user.

According to another aspect of the present disclosure, there is provided a control program by a control device for a moving body, the control device including an outside recognition unit configured to acquire recognition data which is data of an outside of the moving body, a parking control unit configured to perform parking control to park the moving body at a parking position selected by a user of the moving body based on the recognition data, and a registration processing unit configured to register the parking position as a designated parking position, in which, when the user selects the parking position, the control program causes a processor of the control device to execute processing of detecting feature points of the parking position, starting a registration process of registering the parking position as the designated parking position, including a verification process for the feature points when the feature point can be acquired, inquiring of the user whether a registration for the designated parking position is needed after starting of the verification process, and registering the parking position as the designated parking position based on a reply to whether the registration is needed received from the user.

According to the present disclosure, it is possible to provide a control device, a control method, and a control program capable of efficiently performing a registration process for a parking position.

DESCRIPTION OF EMBODIMENTS

Figure 1:
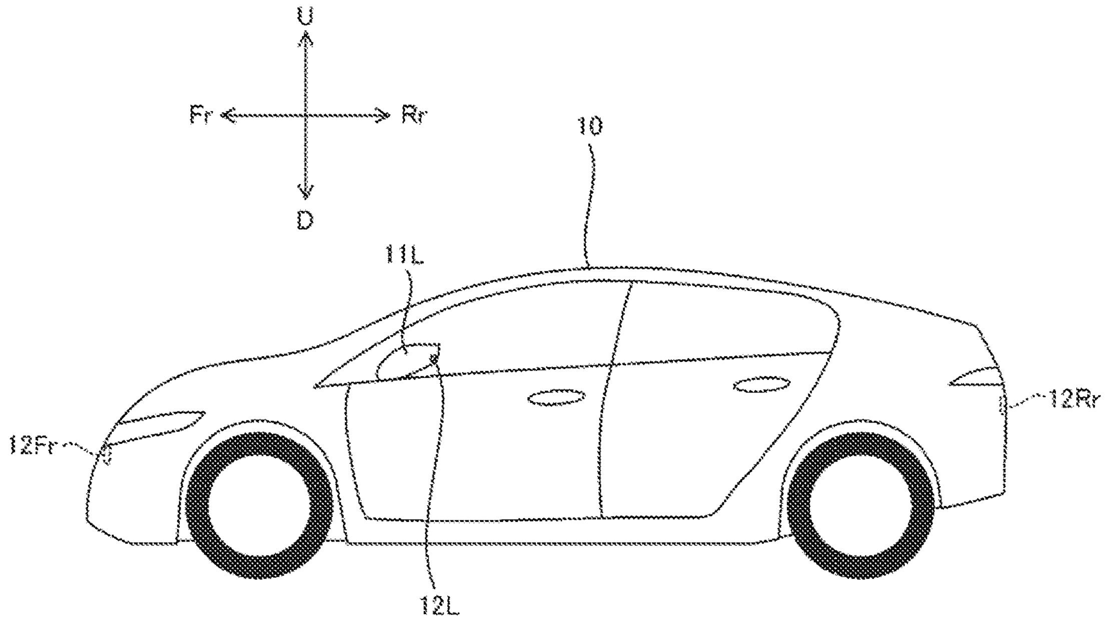
FIG. 1 is a side view illustrating an example of a vehicle in which a control device according to an embodiment is mounted.

Hereinafter, a control device, a control method, and a control program according to the present disclosure will be described with reference to the appended drawings. It is assumed that the drawings are viewed in directions of reference numerals. In the present specification or the like, to simplify and clarify description, front and rear directions, left and right directions, and up and down directions are described in directions viewed from a driver of a vehicle 10 illustrated in FIGS. 1 and 2. In the drawings, Fr, Rr, L, R, U, and D denote front, rear, left, right, up, and down sides of the vehicle 10, respectively.

<Vehicle 10 Mounted with Control Device According to Present Disclosure>

Figure 2:
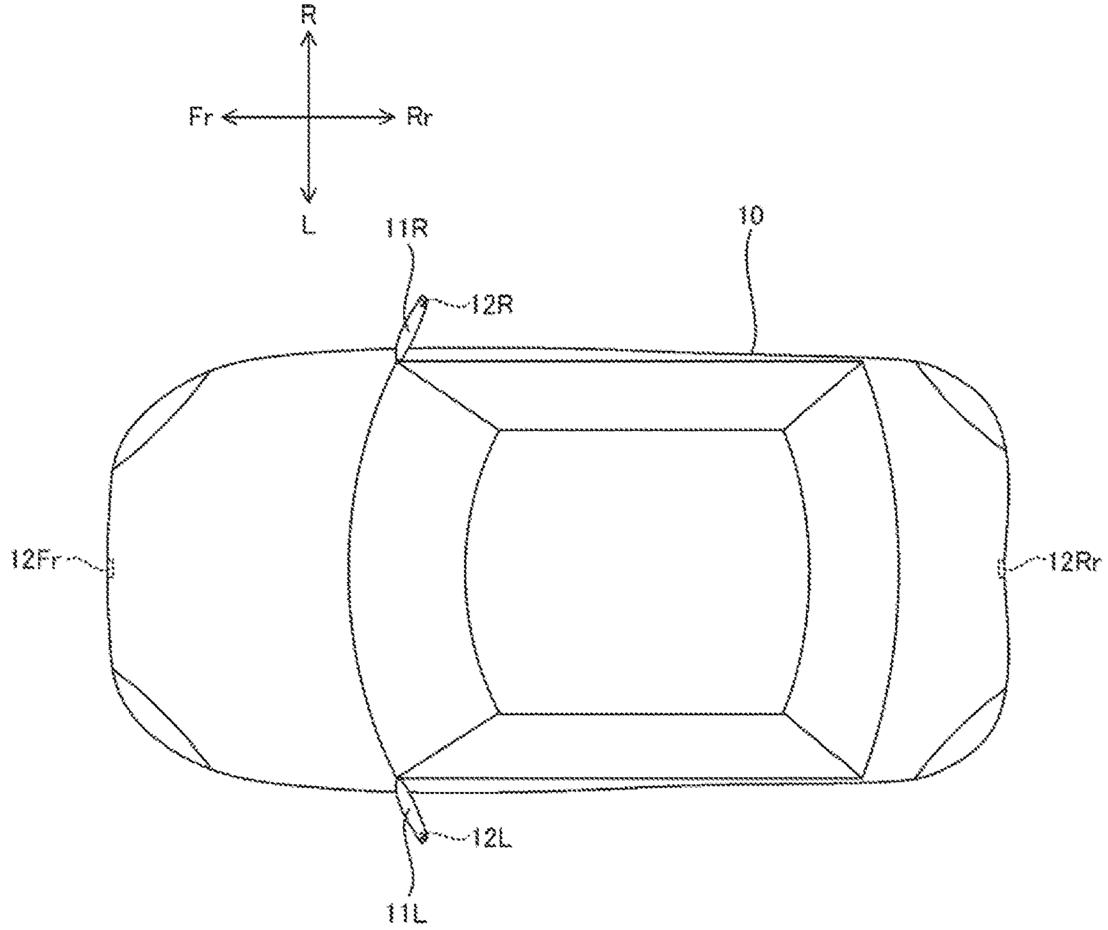
FIG. 2 is a top view illustrating the vehicle illustrated in FIG. 1.

FIG. 1 is a side view illustrating the vehicle 10 in which a control device according to the present disclosure is mounted. FIG. 2 is a top view illustrating the vehicle 10 illustrated in FIG. 1. The vehicle 10 is an example of a moving body according to the present disclosure.

The vehicle 10 is an automobile which includes a driving source (not illustrated) and wheels including a driving wheel driven by power of the driving source and a steerable steering wheel. In the embodiment, the vehicle 10 is a four-wheel automobile which includes a pair of left and right front wheels and a pair of left and right rear wheels. The driving source of the vehicle 10 is, for example, an electric motor. The driving source of the vehicle 10 may be an internal combustion engine such as a gasoline engine or a diesel engine, or may be a combination of an electric motor and an internal combustion engine. The driving source of the vehicle 10 may drive the pair of left and right front wheels, may drive the pair of left and right rear wheels, or may drive the pairs of left and right front and rear wheels. The front and rear wheels may be both steerable steering wheels or any one thereof may be a steerable steering wheel.

The vehicle 10 further includes side mirrors 11L and 11R. The side mirrors 11L and 11R are mirrors (rearview mirrors) provided in the outside of the front doors of the vehicle 10 and used for the driver to check the rear side and the rear lateral side. The side mirrors 11L and 11R are fixed to the body of the vehicle 10 by rotational shafts extending in the vertical direction and can be opened and closed by rotating about the rotational shafts.

The vehicle 10 further includes a front camera 12Fr, a rear camera 12Rr, a left side camera 12L, and a right side camera 12R. The front camera 12Fr is a digital camera which is provided in the front of the vehicle 10 and captures the front side of the vehicle 10. The rear camera 12Rr is a digital camera which is provided in the rear of the vehicle 10 and captures the rear side of the vehicle 10. The left side camera 12L is a digital camera which is provided in the left side mirror 11L of the vehicle 10 and captures the left side of the vehicle 10. The right side camera 12R is a digital camera which is provided in the right side mirror 11R of the vehicle 10 and captures the right side of the vehicle 10.

<Internal Configuration of Vehicle 10>

Figure 3:
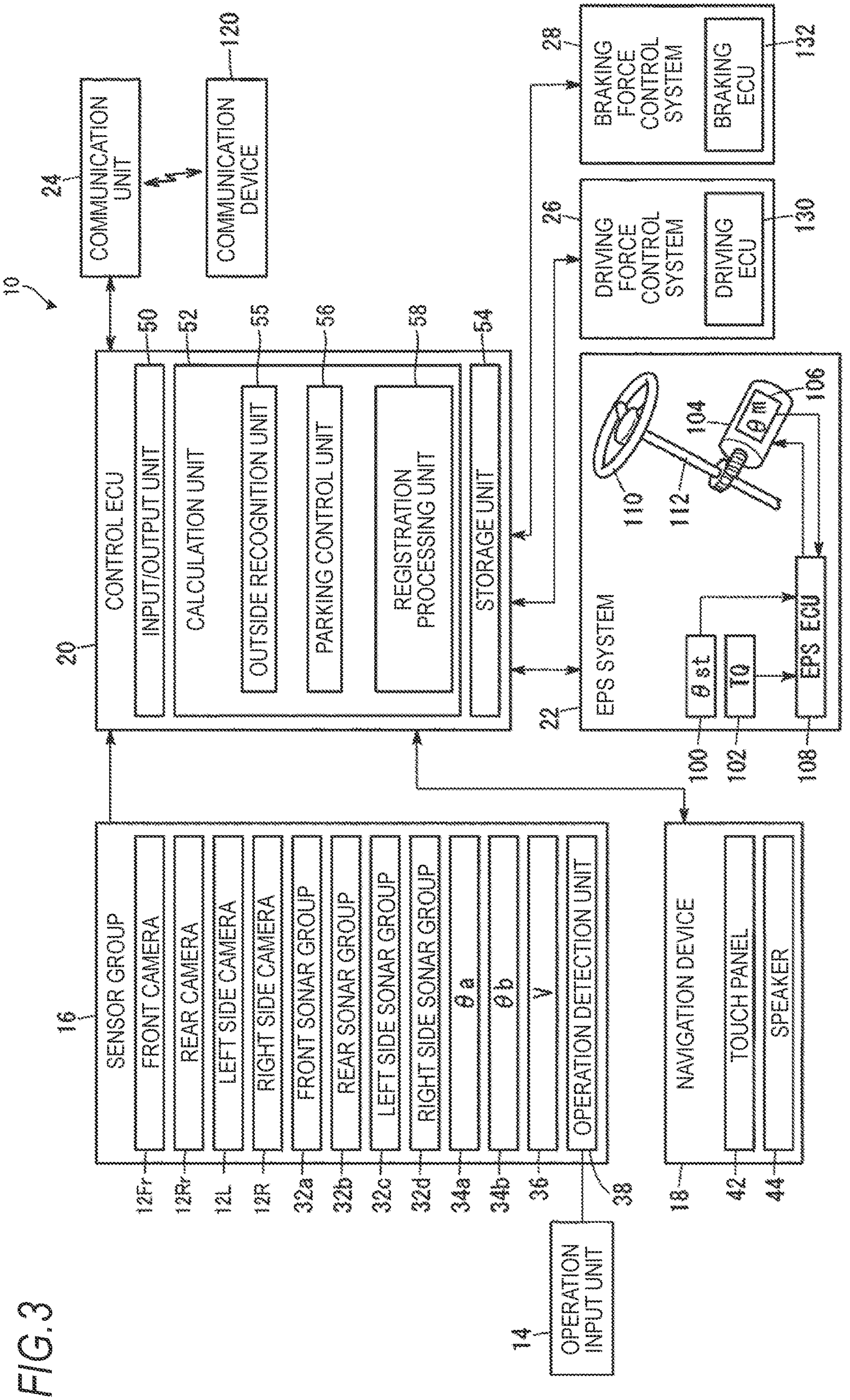
FIG. 3 is a block diagram illustrating an internal configuration of the vehicle illustrated in FIG. 1.

FIG. 3 is a block diagram illustrating an example of an internal configuration of the vehicle 10 illustrated in FIG. 1. As illustrated in FIG. 3, the vehicle 10 includes a sensor group 16, a navigation device 18, a control electronic control unit (ECU) 20, an electric power steering (EPS) system 22, and a communication unit 24. The vehicle 10 further includes a driving force control system 26 and a braking force control system 28.

The sensor group 16 acquires various detected values used for control by the control ECU 20. The sensor group 16 includes the front camera 12Fr, a rear camera 12Rr, the left side camera 12L, and the right side camera 12R. The sensor group 16 includes a front sonar group 32*a*, a rear sonar group 32*b*, a left side sonar group 32*c*, and a right side sonar group 32*d*. The sensor group 16 includes wheel sensors 34*a* and 34*b*, a vehicle speed sensor 36, and an operation detection unit 38.

The front camera 12Fr, the rear camera 12Rr, the left side camera 12L, and the right side camera 12R acquire recognition data (for example, peripheral images) for recognizing the outside of the vehicle 10 by capturing the periphery of the vehicle 10. The peripheral images captured by the front camera 12Fr, the rear camera 12Rr, the left side camera 12L, and the right side camera 12R are referred to as a front image, a rear image, a left side image, and a right side image, respectively. Images formed by the left side image and the right side image may also be referred to as side images.

The front sonar group 32*a*, the rear sonar group 32*b*, the left side sonar group 32*c*, and the right side sonar group 32*d* emit ultrasonic waves to the periphery of the vehicle 10 and receive waves reflected from other objects. The front sonar group 32*a* includes, for example, four sonars. The sonars included in the front sonar group 32*a* are respectively provided in diagonally left front, left front, right front, and diagonally right front of the vehicle 10. The rear sonar group 32*b* includes, for example, four sonars. The sonars included in the rear sonar group 32*b* are respectively provided in diagonally left rear, left rear, right rear, and diagonally right rear of the vehicle 10. The left side sonar group 32*c* includes, for example, two sonars. The sonars included in the left side sonar group 32*c* are provided in left side front and left side rear of the vehicle 10. The right side sonar group 32*d* includes, for example, two sonars. The sonars included in the right side sonar group 32*d* are provided in right side front and right side rear of the vehicle 10.

The wheel sensors 34*a* and 34*b* detect rotational angles of the wheels of the vehicle 10. The wheel sensors 34*a* and 34*b* may be configured with angle sensors or may be configured with displacement sensors. The wheel sensors 34*a* and 34*b* output detection pulses whenever the wheels are rotated by a predetermined angle. The detection pulses output from the wheel sensors 34*a* and 34*b* are used to calculate a rotational angle of the wheels and a rotational speed of the wheels. Based on the rotational angle of the wheels, a movement distance of the vehicle 10 is calculated. The wheel sensor 34*a* detects, for example, a rotational angle θa of the left rear wheel. The wheel sensor 34*b* detects, for example, a rotational angle θb of the right rear wheel.

The vehicle speed sensor 36 detects a speed of the body of the vehicle 10, that is, a vehicle speed V, and outputs the detected vehicle speed V to the control ECU 20. The vehicle speed sensor 36 detects the vehicle speed V based on, for example, rotation of a counter shaft of a transmission.

The operation detection unit 38 detects operation content performed by a user using an operation input unit 14 and outputs the detected operation content to the control ECU 20. The operation input unit 14 includes, for example, various user interfaces such as a side mirror switch switching between opening and closing states of the side mirrors 11L and 11R, and a shift lever (a select lever or a selector).

The navigation device 18 detects a current position of the vehicle 10 using, for example, a global positioning system (GPS) and guides the user along a route to a destination. The navigation device 18 includes a storage device (not illustrated) including a map information database.

The navigation device 18 includes a touch panel 42 and a speaker 44. The touch panel 42 functions as an input device and a display device of the control ECU 20. The speaker 44 outputs various types of guide information by a sound to a user (passenger) of the vehicle 10.

The touch panel 42 is configured such that various instructions can be input to the control ECU 20. For example, the user can input an instruction related to movement support of the vehicle 10 via the touch panel 42. The movement support includes parking support and leaving support of the vehicle 10. The touch panel 42 is configured to display various screens related to the control content of the control ECU 20. For example, a screen related to the movement support of the vehicle 10 is displayed on the touch panel 42. Specifically, a parking support button for requesting the parking support of the vehicle 10 and a leaving support button for requesting the leaving support are displayed on the touch panel 42. The parking support button includes an automatic parking button for requesting parking by automatic steering of the control ECU 20 and an assistant parking button for requesting assistance during parking by an operation of the driver. The leaving support button includes an automatic leaving button for requesting leaving by automatic steering of the control ECU 20 and an assistant leaving button for requesting assistance during leaving by an operation of the driver. A constituent other than the touch panel 42, for example, an information terminal such as a smartphone or a tablet terminal may be used as an input device or a display device.

For example, "parking" is stopping associated with boarding and descending of an occupant, and temporary stopping by a traffic signal and the like is excluded. "Parking position" is a position at which the moving body stops, that is, a position at which parking is performed.

The control ECU 20 includes an input/output unit 50, a calculation unit 52, and a storage unit 54. The calculation unit 52 is configured with, for example, a central processing unit (CPU). The calculation unit 52 performs various types of control by controlling each unit based on a program stored in the storage unit 54. The calculation unit 52 inputs and outputs a signal between each unit connected to the control ECU 20 via the input/output unit 50. The calculation unit 52 is an example of a control device according to the present invention.

The calculation unit 52 includes an outside recognition unit 55 which acquires outside recognition data of the vehicle 10, a parking control unit 56 which performs parking control to park the vehicle 10 at the selected parking position, and a registration processing unit 58 which registers the selected parking position as a designated parking position.

The outside recognition unit 55 acquires peripheral images (recognition data of an outside) of the vehicle 10 captured by the front camera 12Fr, the rear camera 12Rr, the left side camera 12L, and the right side camera 12R from each camera. The outside recognition unit 55 can also acquire outside recognition data of the vehicle 10 acquired by the sonar groups 32*a* to 32*d* or a radar.

The parking control unit 56 performs parking support of the vehicle 10 through automatic steering in which an operation of a steering 110 is performed automatically under the control of the parking control unit 56. In the automatic steering support, operations on an acceleration pedal (not illustrated), a brake pedal (not illustrated), and the operation input unit 14 are automatically performed. The parking control unit 56 performs assistant parking support when the driver performs the operations on the acceleration pedal, the brake pedal, and the operation input unit 14 and manually parks the vehicle 10.

For example, the parking control unit 56 performs automatic parking control to park the vehicle 10 at the selected parking position based on the recognition data of the outside of the vehicle 10 acquired by the front camera 12Fr, the rear camera 12Rr, the left side camera 12L, and the right side camera 12R and the selection of the parking position by the user.

When the user selects a parking position at which the vehicle 10 is to be parked, the registration processing unit 58 detects feature points of the selected parking position. The registration processing unit 58 detects feature points of the parking position at a start point of the parking control by which the vehicle 10 is parked at the selected parking position. For example, the feature points are detected at a time point at which the vehicle 10 is temporarily stopped and the automatic parking button is operated when the automatic parking is started at a parking lot.

When the feature points of the parking position can be acquired, the registration processing unit 58 starts a registration process of registering the parking position as a designated parking position. The registration process includes a verification process of verifying the feature points of the parking position. The verification process is a process of verifying position estimation of the vehicle 10 based on the feature points, that is, a process of verifying whether a relative position of the vehicle 10 to the parking position can be estimated based on the feature points. The registration processing unit 58 starts the registration process for the designated parking position when the number of acquired feature points is equal to or greater than a predetermined number (for example, three or more).

Even when the feature points of the parking positions cannot be acquired at the start point of the parking control, when the feature points can be acquired during the automatic parking at the parking position, the registration processing unit 58 may start the registration process of registering the parking position as a designated parking position at a time point at which the feature points can be acquired.

The registration processing unit 58 inquires of the user about whether it is necessary to register the designated parking position after the starting of the verification process for the feature points. For example, the registration processing unit 58 inquires of the user whether the registration is needed for the designated parking position when the parking of the vehicle 10 at the parking position by the parking control is completed after the starting of the verification process for the feature points. The registration processing unit 58 inquires of the user whether the registration is needed for the designated parking position when the position of the vehicle 10 can be estimated based on the acquired feature points. The registration processing unit 58 registers the parking position selected by the user as the designated parking position in the storage unit 54 based on a reply to whether the registration is needed for the designated parking position received from the user.

The registration processing unit 58 performs control to move the vehicle 10 so that, when the user selects the parking position, the selected parking position is located within a predetermined range regarding the vehicle 10. The predetermined range is a range appropriate for detecting the feature points for the vehicle 10 which will be parked. For example, when the left side camera 12L and the right side camera 12R of the vehicle 10 are cameras appropriate for detecting the feature points, the predetermined range regarding the vehicle 10 is a lateral side of the vehicle 10.

The registration processing unit 58 starts a process of verifying position estimation of the vehicle 10 or does not perform the process of verifying the position estimation of the vehicle 10 after completion of the parking at the parking position of the vehicle 10 by the parking control when the feature points of the parking position at a start point of the parking control by which the vehicle 10 is parked at the selected parking position cannot be acquired. The registration processing unit 58 starts the process of verifying the position estimation of the vehicle 10 based on the feature points acquired during the parking of the vehicle 10 at the parking position and acquired after the completion of the parking.

The registration processing unit 58 deletes data related to the registration process when a reply indicating that the registration is not needed is received from the user in response to the inquiry of whether the registration is needed. When the reply indicating the registration is not needed is received from the user in response to the inquiry of whether the registration is needed, the registration processing unit 58 may retain the data related to the registration process until a predetermined timing (for example, ignition-off) and may inquire again of the user whether the registration is needed, or output guide information regarding the registration to the user. The guide information regarding the registration is, for example, an advantage of subsequent parking by registering the designated parking position. The guide information regarding the registration may be output only when the designated parking position was not registered.

The EPS system 22 includes a steering angle sensor 100, a torque sensor 102, an EPS motor 104, a resolver 106, and an EPS ECU 108. The steering angle sensor 100 detects a steering angle Est of the steering 110. The torque sensor 102 detects a torque TQ applied to the steering 110.

The EPS motor 104 enables automatic steering while supporting operation or parking of the steering 110 by an occupant by applying a driving force or a reaction force to a steering column 112 connected to the steering 110. The resolver 106 detects a rotational angle θm of the EPS motor 104. The EPS ECU 108 is in charge of controlling the entire EPS system 22. The EPS ECU 108 includes an input/output unit (not illustrated), a calculation unit (not illustrated), and a storage unit (not illustrated).

The communication unit 24 enables wireless communication with another communication device 120. The other communication device 120 is an information terminal such as a base station, a communication device of another vehicle, or a smartphone carried by a passenger of the vehicle 10.

The driving force control system 26 includes a driving ECU 130. The driving force control system 26 performs driving force control of the vehicle 10. The driving ECU 130 controls a driving force of the vehicle 10 by controlling an engine or the like (not illustrated) based on an operation on the acceleration pedal (not illustrated) by the user.

The braking force control system 28 includes a braking ECU 132. The braking force control system 28 performs braking force control of the vehicle 10. The braking ECU 132 controls a braking force of the vehicle 10 by controlling a brake mechanism or the like (not illustrated) based on an operation on the brake pedal (not illustrated) by the user.

Figure 4:
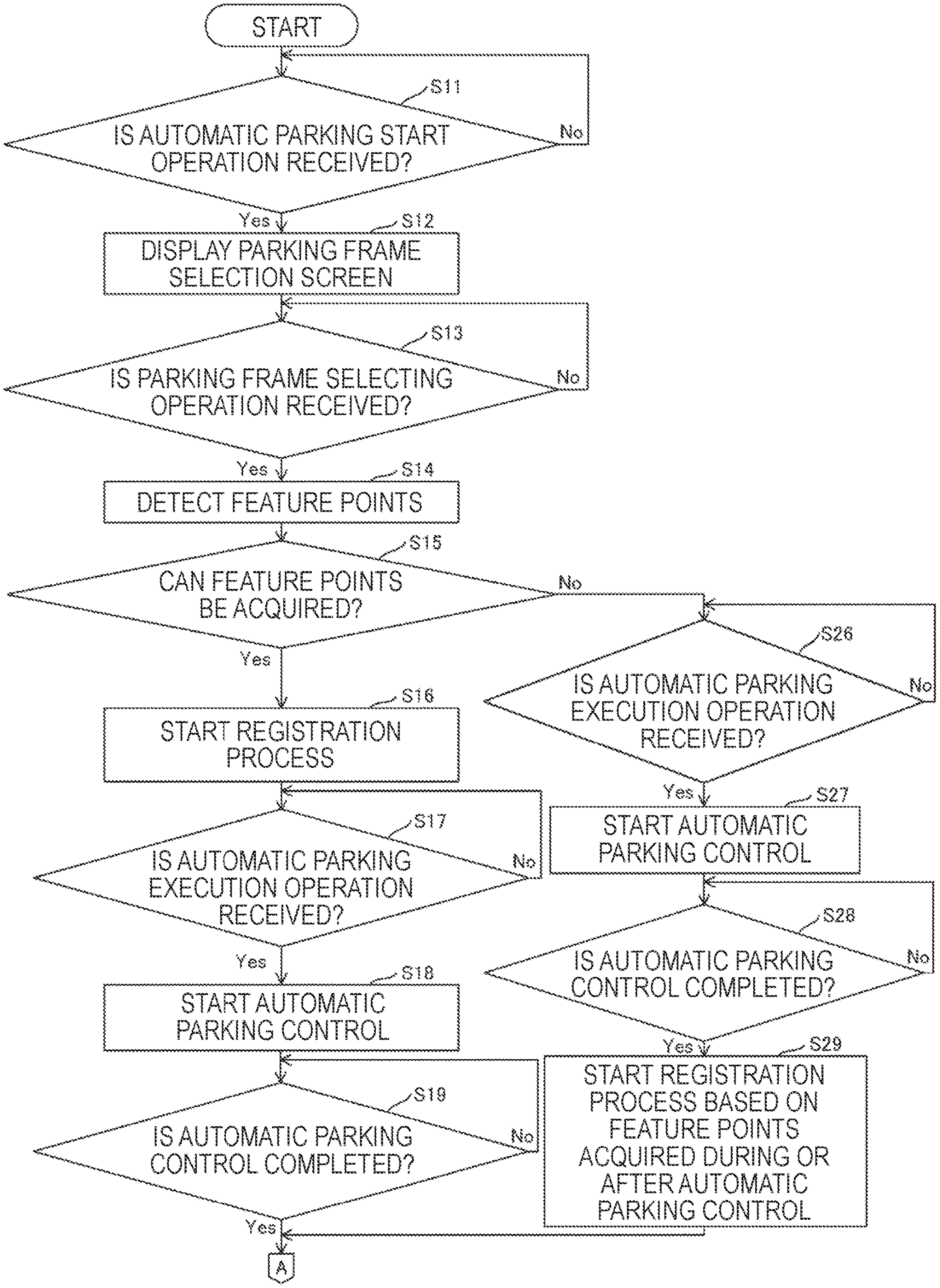
FIG. 4 is a flowchart illustrating an example of a registration process for a parking position performed by a calculation unit.
Figure 5:
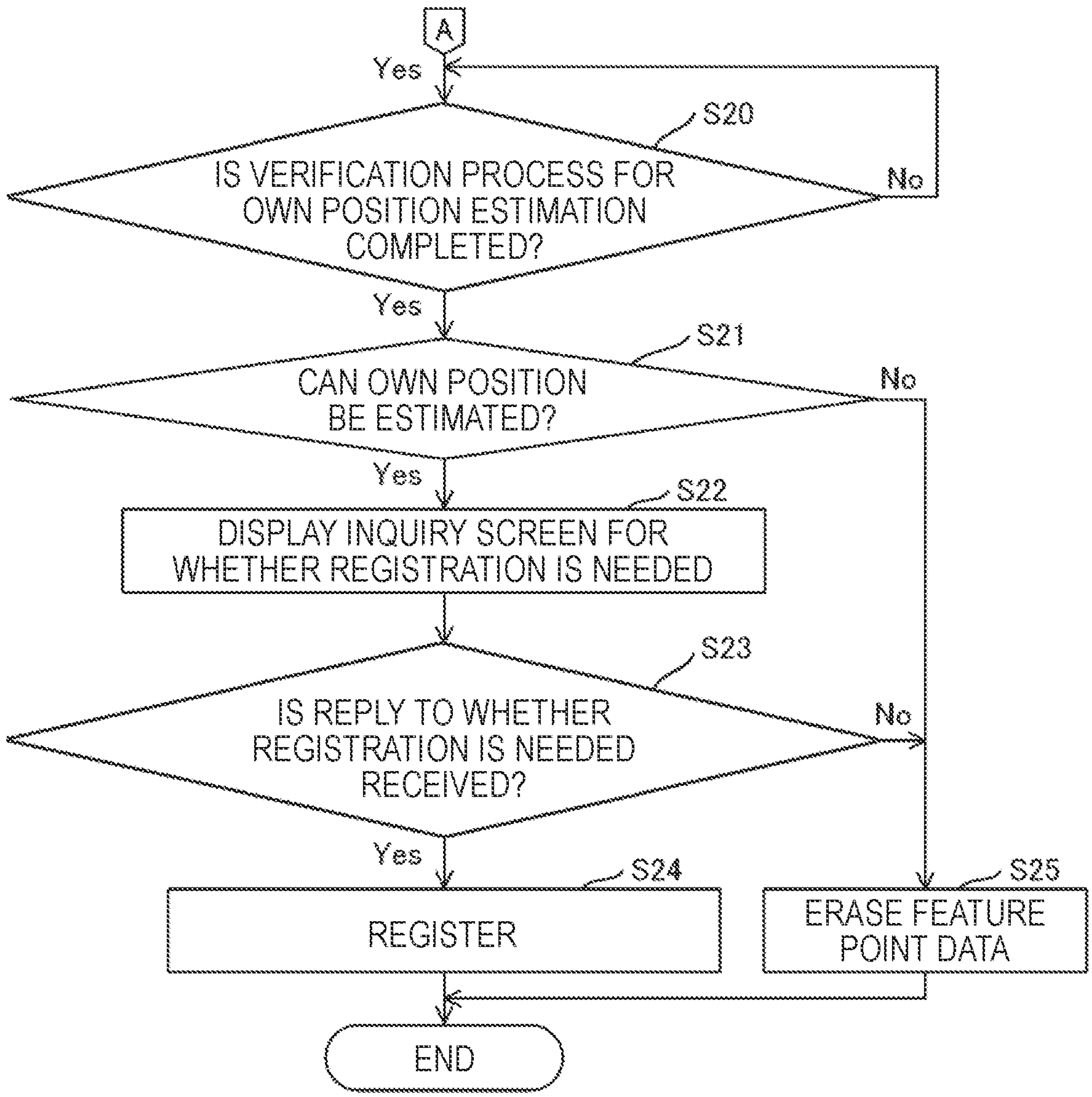
FIG. 5 is a flowchart illustrating an example of the registration process for the parking position performed by the calculation unit.

Control Example of Control Device (Calculation Unit 52) in Automatic Parking Next, a registration process for a parking position performed by the calculation unit 52 of the vehicle 10 in the automatic parking will be described. FIGS. 4 and 5 are flowcharts illustrating an example of a registration process for a parking position performed by the calculation unit 52. The calculation unit 52 starts a process illustrated in FIG. 4, for example, when a touch operation is performed on the automatic parking button displayed on the touch panel 42. The user who wants to park the vehicle 10 performs the touch operation on the automatic parking button, for example, when the user comes near a parking lot.

First, the registration processing unit 58 of the calculation unit 52 determines whether to receive an automatic parking start operation to start the automatic parking of the vehicle 10 (step S11). The automatic parking start operation is, for example, a touch operation on the automatic parking button displayed on the touch panel 42.

When the automatic parking start operation is not received in step S11 (No in step S11), the registration processing unit 58 repeats the process of step S11. When the automatic parking start operation is received in step S11 (Yes in step S11), the registration processing unit 58 displays a parking frame selection screen on the touch panel 42 which can be operated by the user to select a parking position at which the vehicle 10 will be parked (step S12). The operation on the parking frame selection screen will be described below with reference to FIG. 7.

Subsequently, the registration processing unit 58 determines whether a parking frame selecting operation on the parking frame selection screen is received, that is, the parking position of the vehicle 10 is selected (step S13). Reception of the parking frame selection operation will be described with reference to FIG. 8.

When the parking frame selecting operation is not received in step S13 (No in step S13), the registration processing unit 58 repeats the process of step S13. When the parking frame selecting operation is received in step S13 (Yes in step S13), the registration processing unit 58 detects the feature points at the parking position selected through the parking frame selecting operation (step S14). The registration processing unit 58 starts detecting the feature points of a designated parking position 64 at a point at which the parking frame selecting operation of the user is received, that is, a start point of the parking control by which the vehicle 10 is parked at the selected designated parking position 64. The registration processing unit 58 detects the feature points at the parking position based on peripheral images (recognition data of outside) of the vehicle 10 captured by the front camera 12Fr, the rear camera 12Rr, the left side camera 12L, and the right side camera 12R. The feature points of the parking position will be described with reference to FIGS. 9 and 13.

Subsequently, the registration processing unit 58 determines whether the feature points of the parking position were acquired (step S15).

When the feature points of the parking position can be acquired in step S15 (Yes in step S15), the registration processing unit 58 starts the registration process including a process of verifying the position estimation of the vehicle 10 based on the acquired feature points (step S16). The verification of the position estimation of the vehicle 10 will be described below with reference to FIG. 9.

Subsequently, when the registration process including the process of verifying the position estimation of the vehicle 10 is started in step S16, the parking control unit 56 of the calculation unit 52 determines whether an automatic parking execution operation is received (step S17). The automatic parking execution operation is an operation of starting movement of the vehicle 10 in the automatic parking and is, for example, a touch operation on a movement start button or an operation of releasing a brake of the stopping vehicle 10.

When the automatic parking execution operation is not received in step S17 (No in step S17), the parking control unit 56 repeats the process of step S17. When the automatic parking execution operation is received in step S17 (Yes in step S17), the parking control unit 56 starts the automatic parking control to park the vehicle 10 at the selected parking position (step S18). The automatic parking control at the selected parking position will be described below with reference to FIG. 10.

Subsequently, the parking control unit 56 determines whether the automatic parking control of the vehicle 10 is completed (step S19).

When the automatic parking control is not completed in step S19 (No in step S19), the parking control unit 56 repeats the process of step S19. When the automatic parking control is completed in step S19 (Yes in step S19), the registration processing unit 58 determines whether the verification process of own position estimation of the vehicle 10 based on the feature points in the registration process started in step S16 is completed (step S20 of FIG. 5).

Conversely, when the feature points of the parking position cannot be acquired in step S15, that is, the feature points of the parking position cannot be acquired at the start point of the automatic parking control (No in step S15), the parking control unit 56 determines whether the automatic parking execution operation is received (step S26). The automatic parking execution operation is similar to the automatic parking execution operation of step S17.

When the automatic parking execution operation is not received in step S26 (No in step S26), the parking control unit 56 repeats the process of step S26. When the automatic parking execution operation is received in step S26 (Yes in step S26), the parking control unit 56 starts the automatic parking control to park the vehicle 10 at the selected parking position (step S27).

Subsequently, the parking control unit 56 determines whether the automatic parking control of the vehicle 10 is completed (step S28).

When the automatic parking control is not completed in step S28 (No in step S28), the parking control unit 56 repeats the process of step S28. When the automatic parking control is completed in step S28 (Yes in step S28), the registration processing unit 58 starts the registration process including the process of verifying the position estimation of the vehicle 10 based on the feature points acquired until the current time at which the automatic parking control is completed (during or after the automatic parking control) (step S29).

Subsequently, the registration processing unit 58 determines whether the verification process of estimating an own position of the vehicle 10 based on the feature points in the registration process started in step S29 is completed (step S20 of FIG. 5).

When the verification process of estimating the own position based on the feature points is not completed in step S20 (No in step S20), the registration processing unit 58 repeats the process of step S20. When the verification process of estimating the own position based on the feature points is completed in step S20 (Yes in step S20), the registration processing unit 58 determines whether the own position can be estimated based on the feature points (step S21).

When the own position based on the feature points can be estimated in step S21 (Yes in step S21), the registration processing unit 58 displays an inquiry screen for inquiring whether the registration is needed for the selected parking position on the touch panel 42 (step S22). The inquiry screen for inquiring whether the registration is needed will be described below in FIG. 12.

Subsequently, the registration processing unit 58 determines whether a reply is received from the user about the inquiry of whether the registration is needed.

When a reply indicating that the registration is needed is received in step S23 (Yes in step S23), the registration processing unit 58 registers the selected parking position as the designated parking position in the storage unit 54 (step S24). When a reply indicating that the registration is needed is not received in step S23 (No in step S23), the registration processing unit 58 deletes data of the acquired feature points of the parking position (step S25). Registration of the designated parking position will be described below in FIG. 13.

When the own position based on the feature points cannot be estimated in step S21 (No in step S21), the process proceeds to step S25 and the registration processing unit 58 deletes the data of the acquired feature points of the parking position.

Next, an image displayed on the touch panel 42 in the registration process for the parking position in the above-described automatic parking of the vehicle 10 will be described. FIGS. 6 to 13 are diagrams illustrating examples of screens displayed on the touch panel 42 in the registration process for the parking position.

Figure 6:
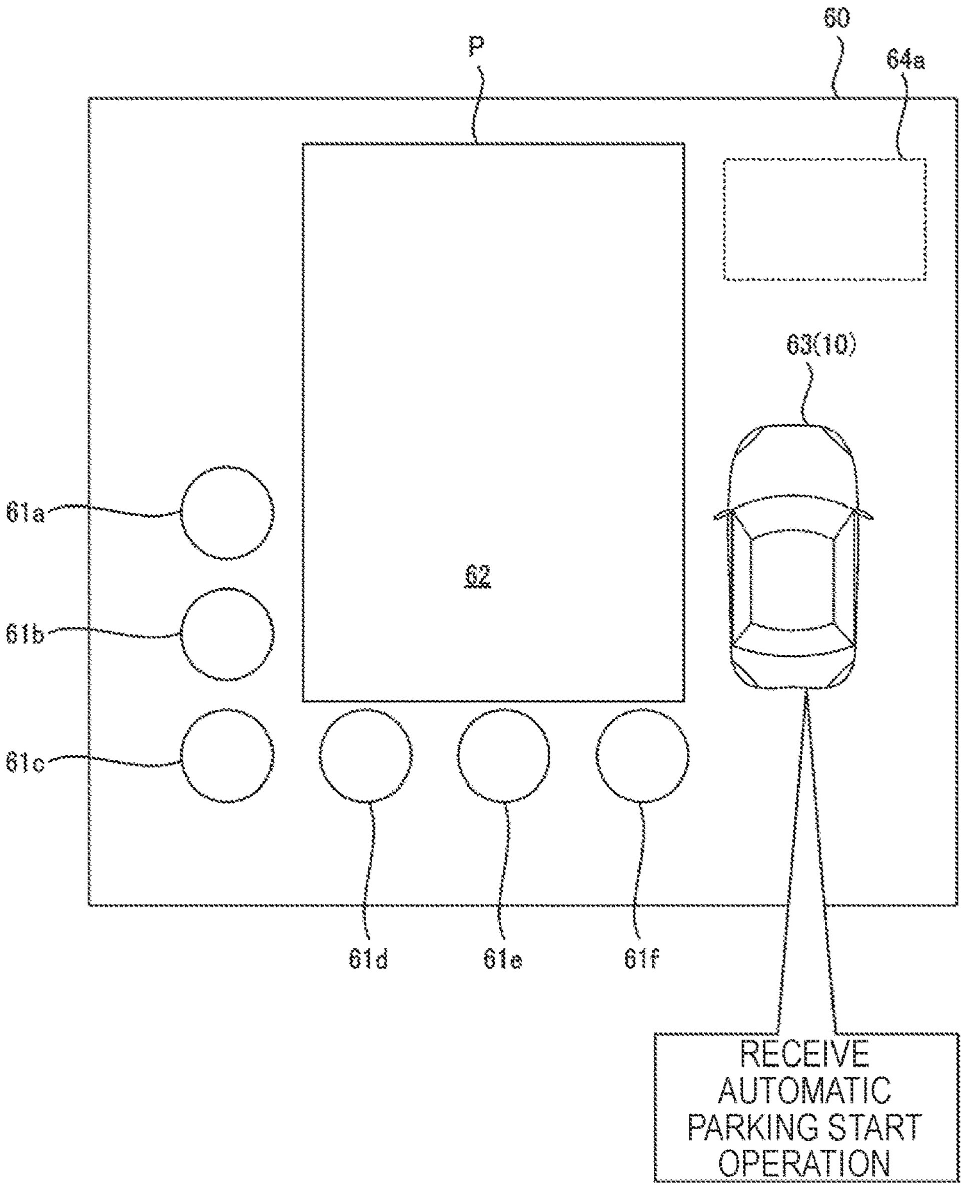
FIG. 6 is a diagram illustrating an example of a bird's-eye view image displayed on a touch panel when automatic parking of a vehicle is started.

FIG. 6 is a diagram illustrating an example of a bird's-eye view image 60 displayed on the touch panel 42 of the vehicle 10 when the automatic parking of the vehicle 10 is started. As illustrated in FIG. 6, the vehicle 10 is stopped in front of a parking lot P to park the vehicle 10 at the parking lot P. The registration processing unit 58 of the vehicle 10 displays the bird's-eye view image 60 on the touch panel 42 when an automatic parking start operation (for example, a touch operation on the automatic parking button) is received.

The bird's-eye view image 60 is a synthesized image generated based on the recognition data of the outside of the vehicle 10 captured by the front camera 12Fr, the rear camera 12Rr, the left side camera 12L, and the right side camera 12R. In the bird's-eye view image 60 illustrated in FIG. 6, the parking lot P and a plurality of plantings (obstructions) 61*a* to 61*f* are captured.

In the bird's-eye view image 60, a rectangular selected parking position 64*a* used to select a parking position is displayed. The user of the vehicle 10 rents a parking region 62 set on the obstructions 61*a* to 61*f* side in the parking lot P as a monthly parking lot. A vehicle stopping in front of the parking lot P is an image in which the vehicle 10 is viewed from the upper side and a vehicle image 63 generated (captured) in advance and stored in the storage unit 54 or the like. The bird's-eye view image 60 in FIG. 6 is, for example, a bird's-eye view image displayed in step S11 of FIG. 4.

Figure 7:
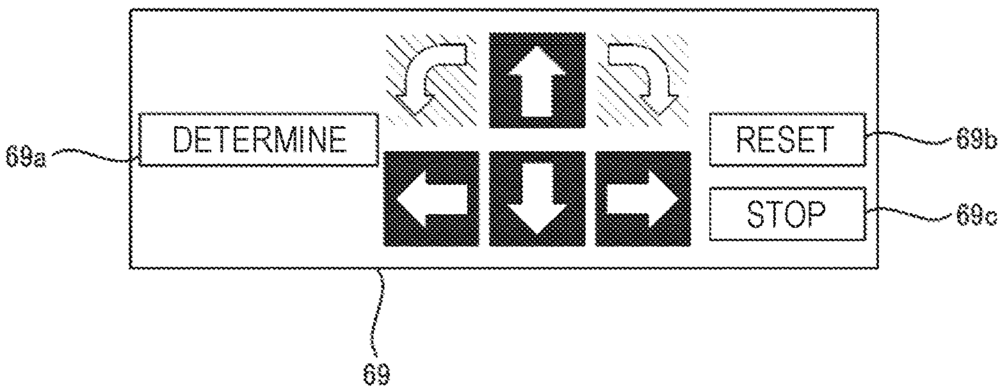
FIG. 7 is a diagram illustrating an example of a parking frame selection screen displayed when a parking position is selected.

FIG. 7 is a diagram illustrating an example of a parking frame selection screen 69 in which a display position of the selected parking position 64*a* can be moved when a parking position of the vehicle 10 is selected. The parking frame selection screen 69 is overlapped on the bird's-eye view image 60 to be displayed in a partial region of the touch panel 42. A cursor indicating a movement direction is displayed on the parking frame selection screen 69 and a display position of the selected parking position 64*a* can be moved in an arrow direction through an operation on the cursor.

In the parking frame selection screen 69, a determination button 69*a* for determining disposition of the selected parking position 64*a*, a reset button 69*b* for cancelling the disposition of the selected parking position 64*a*, and a stop button 69*c* for stopping the disposition of the selected parking position 64*a* are displayed. The parking frame selection screen 69 in FIG. 7 is a parking frame selection screen displayed in step S12 of FIG. 4.

Figure 8:
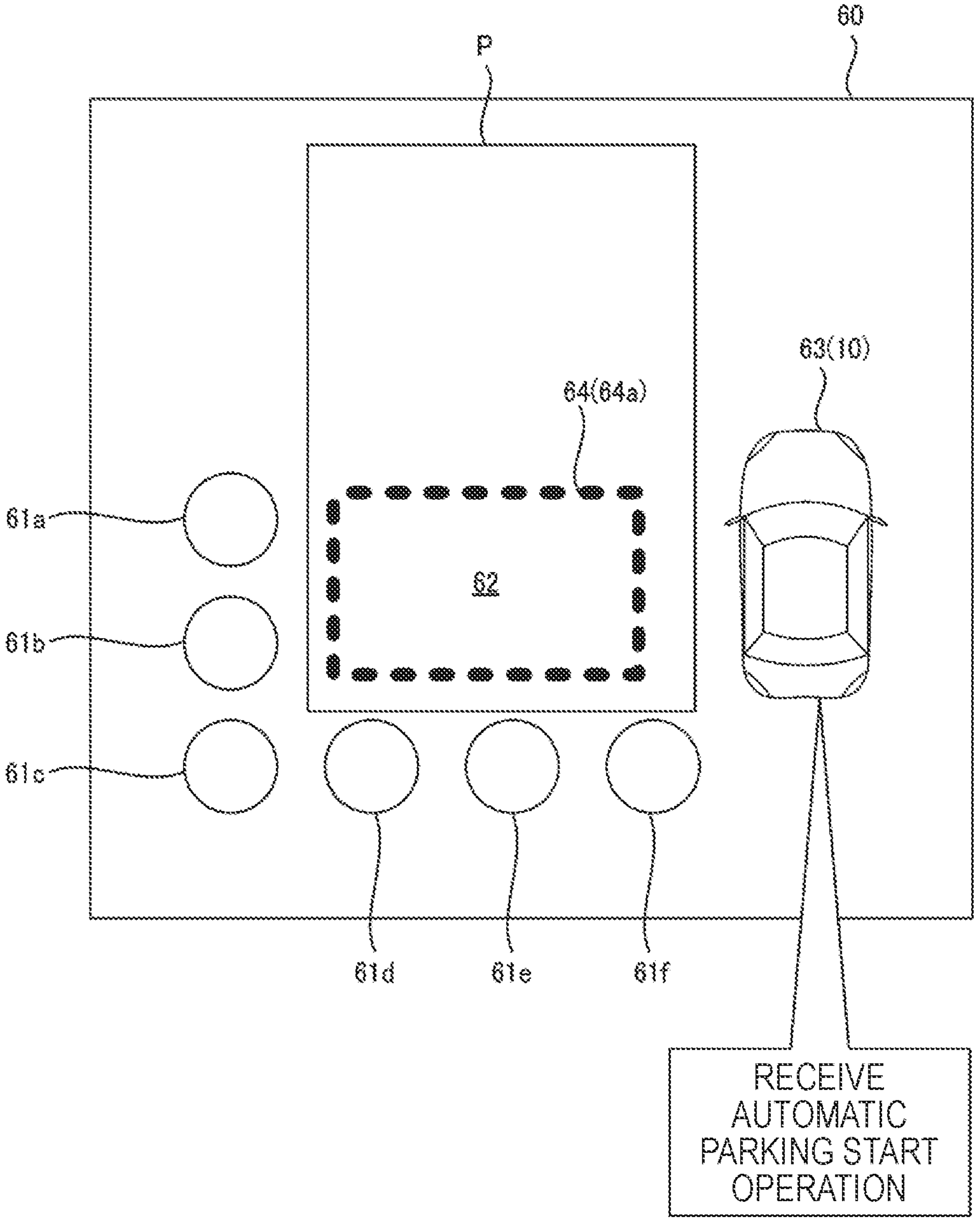
FIG. 8 is a diagram illustrating a designated parking position selected through a parking frame selecting operation on the parking frame selection screen.

FIG. 8 is a diagram illustrating the designated parking position 64 selected through the parking frame selection operation on the parking frame selection screen 69. As illustrated in FIG. 8, the determination button 69*a* of the parking frame selection screen 69 is pressed after a position of the selected parking position 64*a* is moved to surround the parking region 62 of the parking lot P. Accordingly, the registration processing unit 58 selects the selected parking position 64*a* moved to surround the parking region 62 as the designated parking position 64. The bird's-eye view image 60 in FIG. 8 is a bird's-eye view image displayed in step S13 of FIG. 4.

The user can also select the parking region 62 as the designated parking position 64 through manual selection, for example, by performing a swipe operation on the touch panel 42. The manual selection of the designated parking position 64 can be performed by moving the position of the selected parking position 64*a* by a swipe operation for the selected parking position 64*a* to surround the parking region 62, and then detaching a finger from the touch panel 42.

Figure 9:
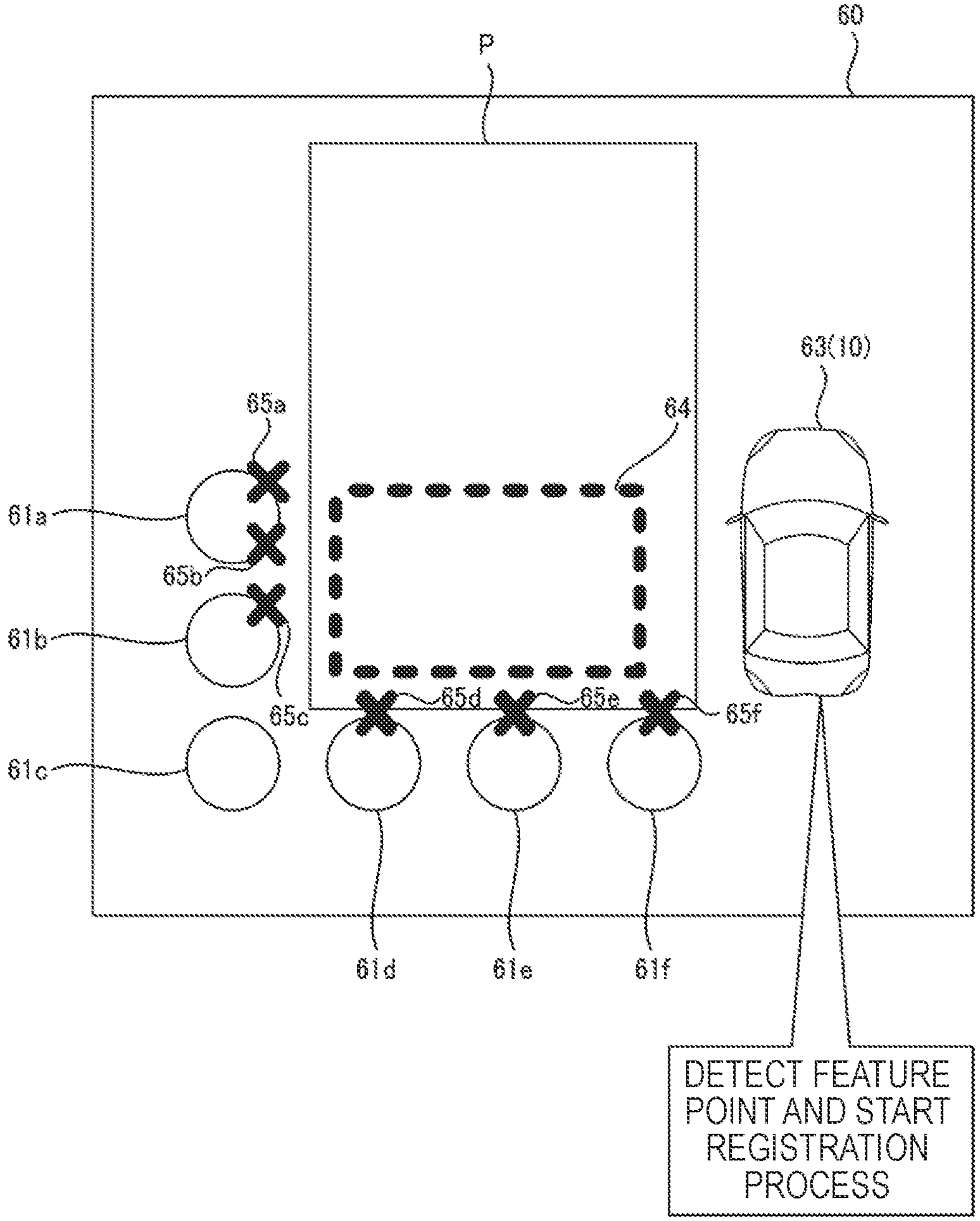
FIG. 9 is a diagram illustrating an example of feature points of the designated parking position.

FIG. 9 is a diagram illustrating an example of the feature points detected with regard to the designated parking position 64 illustrated in FIG. 8. When the designated parking position 64 is selected, the registration processing unit 58 starts detecting the feature points related to the designated parking position 64. The feature points related to the designated parking position include feature points of the designated parking position itself and feature points in the periphery of the designated parking position.

As the feature points of the designated parking position itself, for example, feature points or the like which is text such as "parking" displayed within the designated parking position can be exemplified. As the feature points in the periphery of the designated parking position, for example, characteristic buildings, obstructions, or the like present in the periphery can be exemplified.

The registration processing unit 58 detects objection feature points 65*a* to 65*f* indicating positions of the obstructions 61*a* to 61*f* present around the designated parking position 64 from captured images (camera images) acquired by the outside recognition unit 55, for example, as illustrated in FIG. 9. When the feature points of the designated parking position 64 are acquired, the registration processing unit 58 estimates the camera position with regard to the acquired feature points (a position of the camera such as the front camera 12Fr performing capturing) and starts the verification process of estimating a relative position of the vehicle 10 to the designated parking position 64 based on the estimated camera position. Specifically, the registration processing unit 58 estimates the camera position with regard to the feature points chronologically (maps the camera position to a map of the feature points) and estimates a relative position of the vehicle 10 to the designated parking position 64 based on the chronologically estimated camera positions, an odometry, and the like. The bird's-eye view image 60 in FIG. 9 is a bird's-eye view image displayed from steps S14 to S15 of FIG. 4.

Figure 10:
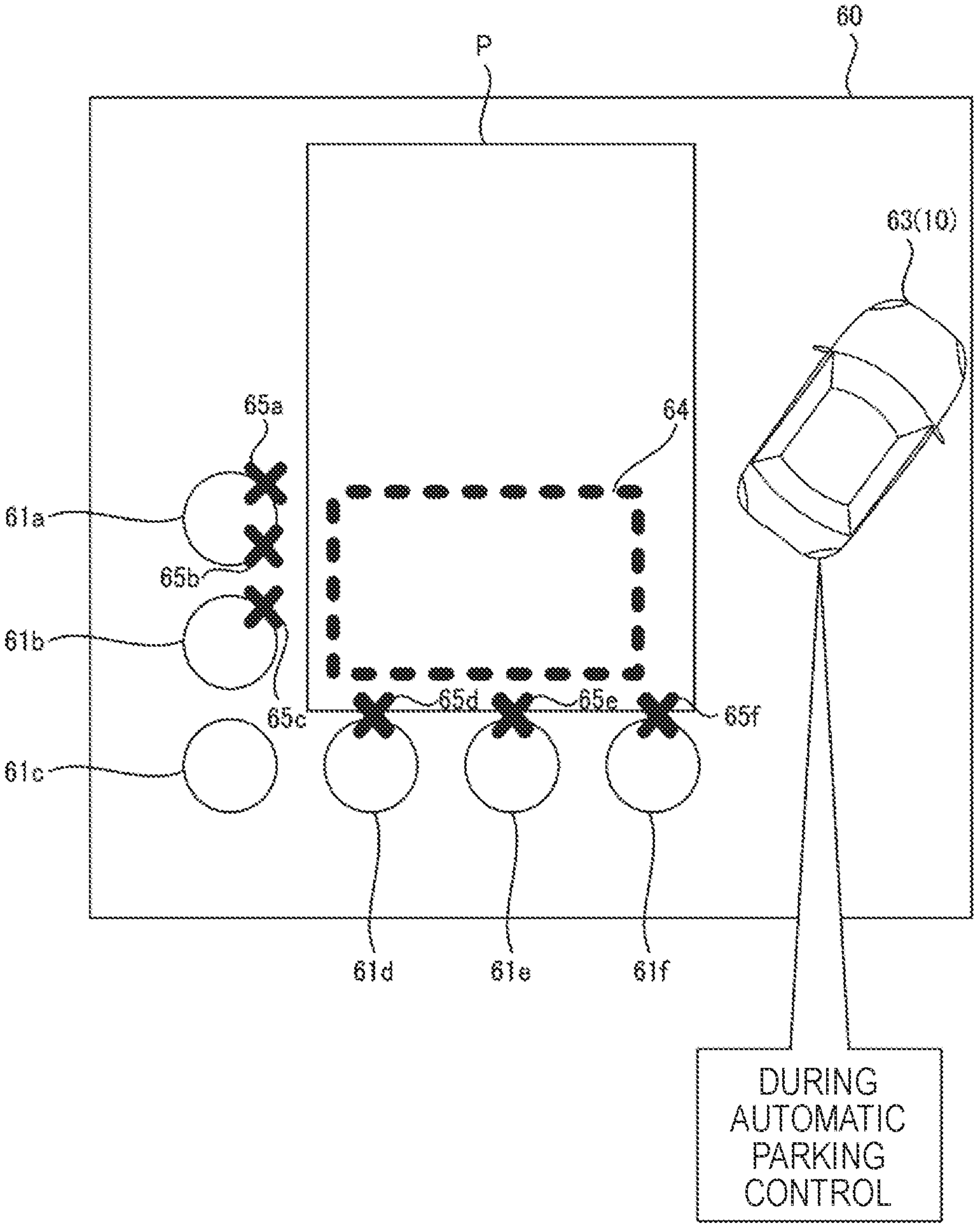
FIG. 10 is a bird's-eye view image illustrating a state of a vehicle automatically parking at the designated parking position.

FIG. 10 is a diagram illustrating the bird's-eye view image 60 illustrating a state of the vehicle 10 started to be automatically parked toward the designated parking position 64. The parking control unit 56 of the vehicle 10 performs automatic parking control to park the vehicle 10 at the designated parking position 64 based on the selected designated parking position 64 and the recognition data of the outside of the vehicle 10 captured by the front camera 12Fr, the rear front 12Rr, the left side camera 12L, and the right side camera 12R. The bird's-eye view image 60 in FIG. 10 is, for example, a bird's-eye view image displayed in step S18 of FIG. 4.

Figure 11:
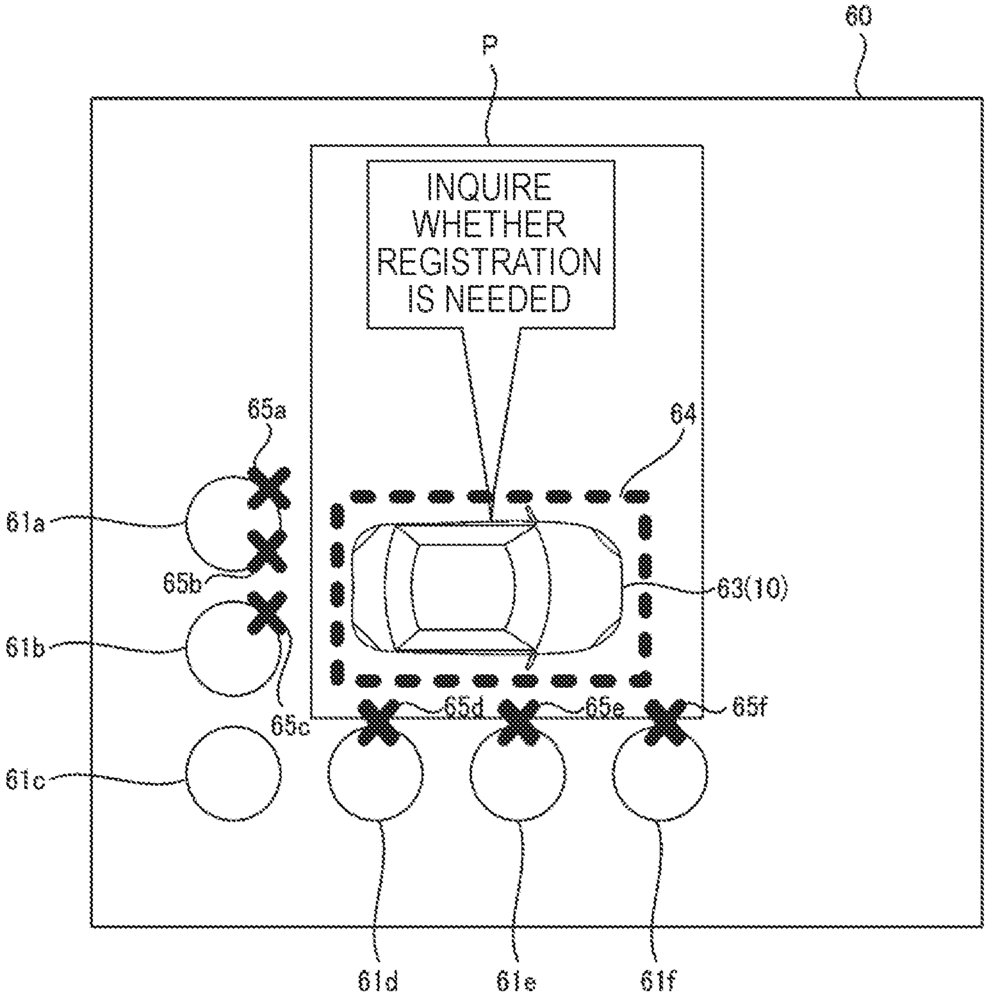
FIG. 11 is a bird's-eye view image illustrating a state in which the automatic parking of the vehicle at the designated parking position is completed.

FIG. 11 illustrates the bird's-eye view image 60 illustrating a state in which the automatic parking of the vehicle 10 at the designated parking position 64 is completed. When the automatic parking at the designated parking position 64 is completed, the registration processing unit 58 of the vehicle 10 determines whether a position of the vehicle 10 with regard to the designated parking position 64 can be estimated based on the feature points. When it is determined that the position of the vehicle 10 with regard to the designated parking position 64 can be estimated, the registration processing unit 58 inquires of the user about whether to register the designated parking position 64 selected by the user as a "designated parking position" of the vehicle 10.

Figure 12:
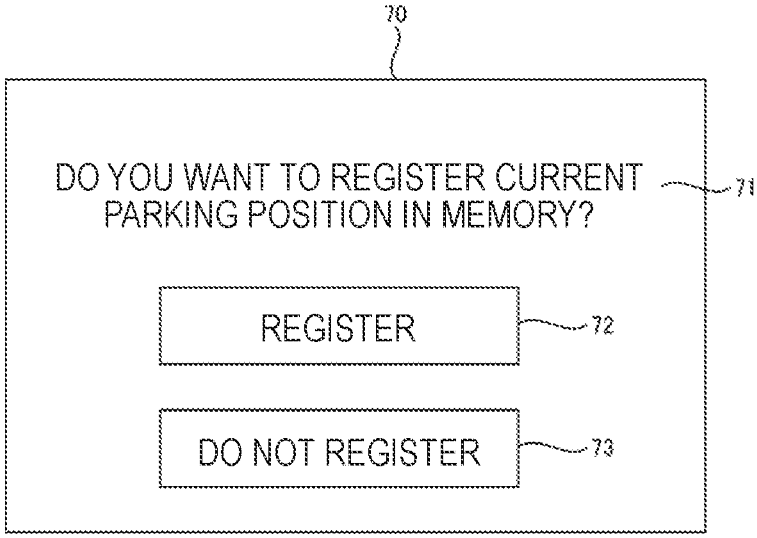
FIG. 12 is a diagram illustrating an example of an inquiry screen for inquiring whether the registration is needed for the designated parking position.

FIG. 12 is a diagram illustrating an example of an inquiry screen 70 for inquiring of the user whether the registration is needed for the designated parking position 64. The inquiry screen 70 is displayed on the touch panel 42. As illustrated in FIG. 12, an inquiry message 71 such as "Do you want to register current parking position in memory?" and a "Register" button 72 and a "Do not register" button 73 for selecting whether the registration is needed, which are operational buttons, are displayed on the inquiry screen 70. The inquiry screen 70 in FIG. 12 is, for example, an inquiry screen displayed in step S22 of FIG. 4.

Figure 13:
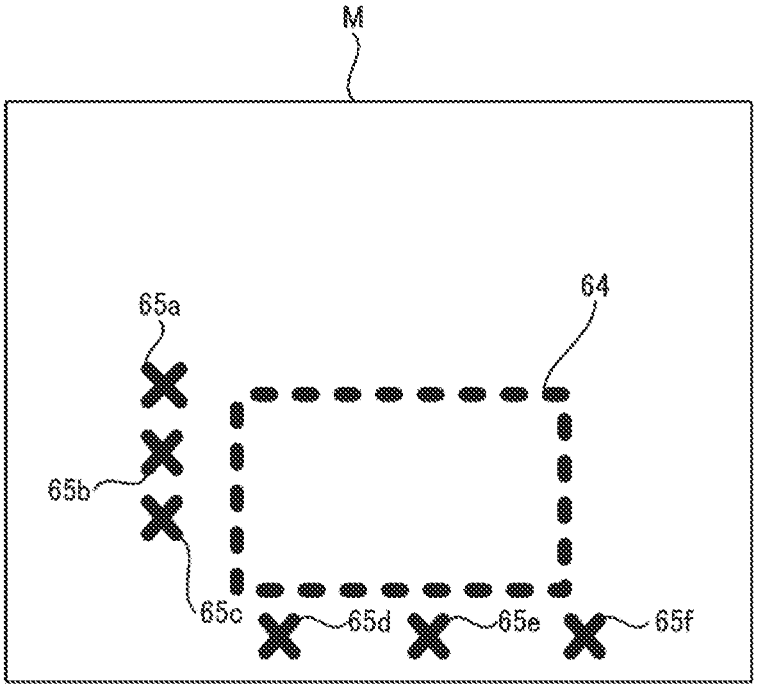
FIG. 13 is a diagram illustrating an example of a map related to the designated parking position registered in a storage unit.

FIG. 13 is a diagram illustrating an example of a map M related to the designated parking position 64 registered in the storage unit 54. When a reply indicating that the registration for registering the designated parking position 64 is needed is received from the user on the inquiry screen 70, the registration processing unit 58 of the vehicle 10 registers information indicating association between the detected obstruction feature points **65*a* to 65*f* and the selected designated parking position 64 as the map M in the storage unit 54**.

The map M in FIG. 13 is, for example, a map registered in step S24 of FIG. 4. In FIGS. 11 to 13 described above, the cases where the own position can be estimated based on the feature points and a reply indicating that the registration is needed is made from the user were described. However, for example, when the own position cannot be estimated or a reply indicating that the registration is not needed is made from the user despite the fact that the own position can be estimated, the registration processing unit 58 erases the feature point data related to the acquired designated parking position 64.

As described above, the registration processing unit 58 of the calculation unit 52 (control device) detects the feature points related to the designated parking position 64 when the designated parking position 64 is selected through the parking frame selecting operation, starts the verification process of verifying the position estimation of the vehicle 10 based on the feature points when the feature points can be acquired, determines whether the position of the vehicle 10 can be estimated based on the feature points when the automatic parking of the vehicle 10 at the designated parking position 64 is completed, and inquires whether the registration is needed for the designated parking position 64 when the position estimation can be performed.

In such configuration, whether the registration is needed for the designated parking position 64 are inquired of the user when the position of the vehicle 10 can be estimated based on the acquired feature points. Therefore, it is possible to prevent a situation in which the position estimation of the vehicle 10 fails, and despite receiving the reply indicating that the registration is needed from the user, the position cannot be registered. Before whether the registration is needed for the designated parking position 64 is inquired of the user, the process of verifying the position estimation of the vehicle 10 based on the feature points is started from a time point at which the feature points related to the designated parking position 64 can be acquired. Therefore, it is possible to shorten a time from receiving an instruction to register the designated parking position 64 to completing the registration.

The registration processing unit 58 starts detecting the feature points of the designated parking position 64 at a point at which a selection of the designated parking position 64 through the parking frame selecting operation of the user is received, that is, a start point of the parking control by which the vehicle 10 is parked at the selected designated parking position 64. Therefore, when the feature points of the designated parking position 64 can be acquired not during the parking control but at the start point of the parking control, the process of estimating the position of the vehicle 10 based on the feature points can be started from the detected time point. Accordingly, it is possible to shorten a time from receiving the instruction to register the designated parking position 64 from the user to completion of the registration.

<Stop Position of Vehicle 10 at Selected Designated Parking Position 64>

Next, a position at which the vehicle 10 is stopped with regard to the designated parking position 64 when the feature points related to the selected designated parking position 64 are detected will be described with reference to FIGS. 14 and 15.

Figure 14:
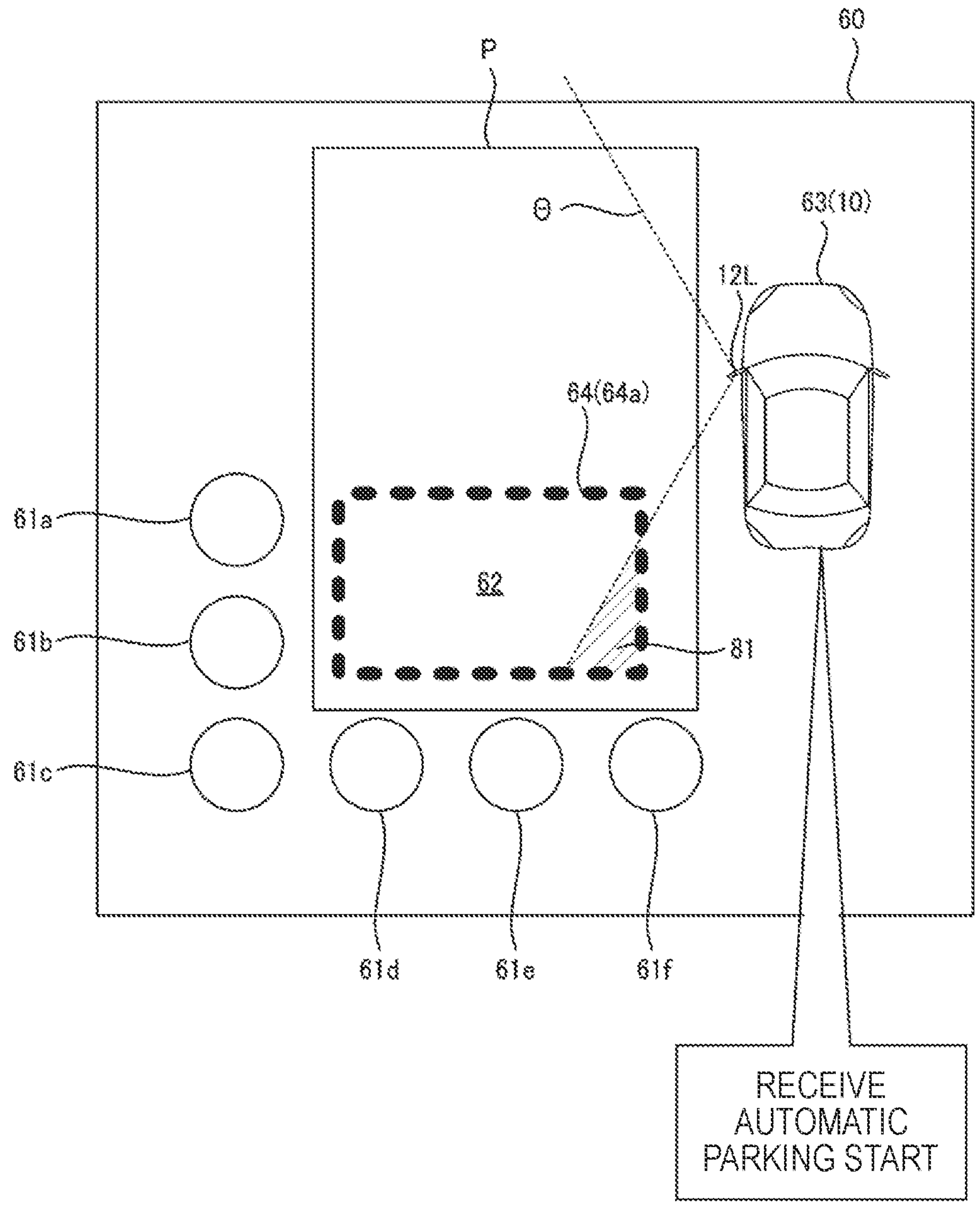
FIG. 14 is a diagram illustrating a vehicle parked in front of a parking lot for automatic parking.

FIG. 14 is a diagram illustrating the vehicle 10 stopped in front of the parking lot P to park the vehicle 10 in the parking lot P. In FIG. 14, the selected parking position **64*a* is moved to surround the parking region 62 of the parking lot P through a cursor operation of the parking frame selection screen 69 and a position of the selected parking position 64*a* is selected as the designated parking position 64**.

Incidentally, for the designated parking position 64 selected in FIG. 14, a partial region 81 is located outside of a predetermined range θ with respect to the stopped vehicle 10. For the vehicle 10, the predetermined range θ is a range appropriate for detecting the feature points of buildings, obstructions, or the like present around the vehicle. The predetermined range θ is a range corresponding to an angle of field of, for example, the left side camera 12L mounted in the vehicle 10.

Accordingly, when the designated parking position 64 selected as such is located outside of the predetermined range θ with respect to the vehicle 10, the registration processing unit 58 performs control to move the vehicle 10 so that the designated parking position 64 is located within the predetermined range θ with respect to the vehicle 10.

Figure 15:
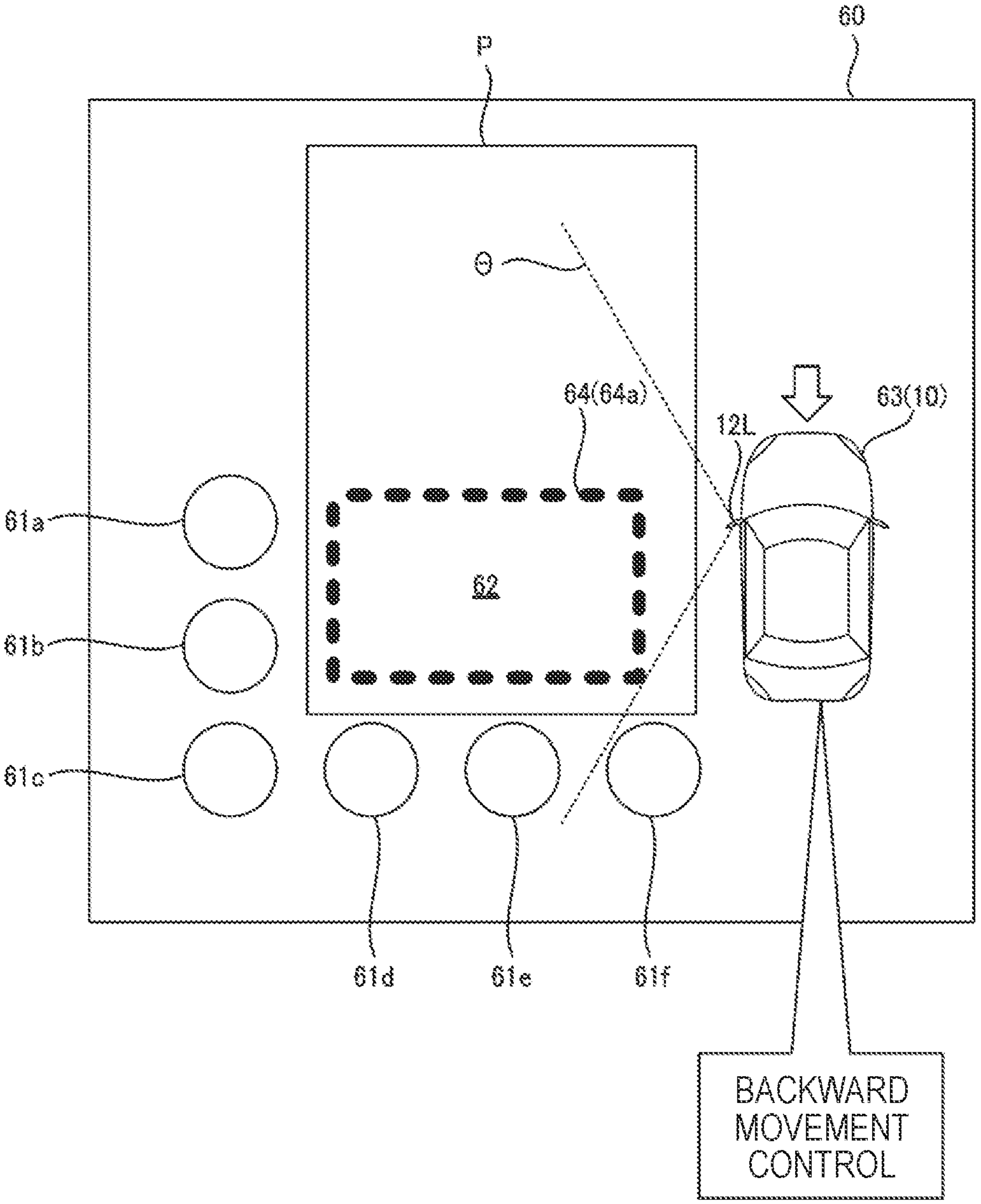
FIG. 15 is a diagram illustrating movement of a vehicle so that the designated parking position is located within a predetermined range regarding the vehicle.

FIG. 15 is a diagram illustrating a state in which the vehicle 10 is moved rearward so that the designated parking position 64 is located within the predetermined range θ with respect to the vehicle 10. The registration processing unit 58 starts a process of detecting the feature points related to the selected designated parking position 64 when the designated parking position 64 is located within the predetermined range θ with respect to the vehicle 10 as in FIG. 15.

In the example illustrated in FIG. 14, the vehicle 10 is stopped so that the designated parking position 64 is located on the left side of the vehicle 10, so the predetermined range θ corresponding to an angle of field of the left side camera 12L was described. But the present invention is not limited thereto. For example, the vehicle 10 may be moved so that the designated parking position 64 is located within a predetermined range corresponding to an angle of field of the right side camera 12R when the vehicle 10 is stopped so that the designated parking position 64 is located on the right side of the vehicle 10, moved so that the designated parking position 64 is located within a predetermined range corresponding to an angle of field of the front camera 12Fr when the vehicle 10 is stopped so that the designated parking position 64 is located in front of the vehicle 10, or moved so that the designated parking position 64 is located within a predetermined range corresponding to an angle of field of the rear camera 12Rr when the vehicle 10 is stopped so that the designated parking position 64 is located behind the vehicle 10.

When the left side camera 12L and the right side camera 12R of the vehicle 10 are cameras appropriate to detect the feature points in the vehicle 10, the vehicle 10 may be moved so that the designated parking position 64 is located within a predetermined range corresponding to an angle of field of the left side camera 12L or the right side camera 12R although the vehicle 10 is stopped so that the designated parking position 64 is located in front of or behind the vehicle 10.

As such, by moving the vehicle 10 so that the designated parking position 64 is located within the predetermined range θ with respect to the vehicle 10 when the automatic parking of the vehicle 10 is started, it is possible to appropriately acquire the feature points related to the designated parking position 64, and thus it is possible to automatically park the vehicle 10 at the designated parking position 64 accurately.

The embodiment of the present invention has been described above, but the present invention is not limited to the foregoing embodiment and modifications, improvements, or the like can be made as appropriate.

For example, in the foregoing embodiment, the case where the vehicle 10 is automatically parked by automatic steering has been described, but the present invention is not limited thereto. For example, the present invention may be applied to parking support in which assistance is performed when the vehicle 10 is parked by an operation of a driver.

In the foregoing embodiment, the case where the bird's-eye view image 60 or the like is displayed on the touch panel 42 of the vehicle 10 has been described, but the present invention is not limited thereto. For example, the bird's-eye view image 60 or the like may be displayed on a display screen of an information terminal (for example, a smartphone or the like) carried by a passenger of the vehicle 10 via the communication unit 24.

In the foregoing embodiment, the case where information such as a map including feature points of the designated parking position is registered in the storage unit 54 of the vehicle 10 has been described, but the present invention is not limited thereto. For example, such information may be registered in a storage unit of another device such as an information terminal or a server communicably connected to the vehicle 10.

In the foregoing embodiment, the example in which the moving body is a vehicle (a four-wheeled automobile) has been described, but the present invention is not limited thereto. For example, the moving body may be a vehicle such as a two-wheeled vehicle or a segway. The idea of the present invention is not limited to a vehicle and can be applied to a robot, a ship, an airplane, or the like which includes a driving source and can be moved by power of the driving source.

The control method described in the above-described embodiment can be implemented by causing a computer to execute a control program prepared in advance. The control program is recorded on a computer-readable storage medium and is executed by being read from the storage medium. The control program may be provided in a form in which the control program is stored in a non-transitory storage medium such as a flash memory or may be provided via a network such as the Internet. A computer which executes the control program may be included in the control device, may be included in an electronic device such as a smartphone, a tablet terminal, or a personal computer capable of communicating with the control device, or may be included in a server device capable of communicating with the control device and the electronic device.

In the present specification, at least the following factors are described. Constituents in parentheses indicate corresponding constituents in the foregoing embodiment, but the present invention is not limited thereto.

(1) A control device (the calculation unit 52) for a moving body (the vehicle 10), the control device including:

an outside recognition unit (the outside recognition unit 55) configured to acquire recognition data which is a data of an outside of the moving body;

a parking control unit (the parking control unit 56) configured to perform parking control to park the moving body at a parking position (the selected parking position 64*a*) selected by a user of the moving body based on the recognition data; and a registration processing unit (the registration processing unit 58) configured to register the parking position as a designated parking position (the designated parking position 64), in which when the user selects the parking position, the registration processing unit is configured to:

detect feature points (the obstruction feature points 65*a* to 65*f*) of the parking position;

start a registration process of registering the parking position as the designated parking position, including a verification process for the feature points when the feature point can be acquired, inquire of the user whether a registration for the designated parking position is needed after starting of the verification process; and register the parking position as the designated parking position based on a reply to whether the registration is needed received from the user.

According to (1), when the feature points of the parking position can be acquired, whether the registration is needed for the parking position are inquired of the user. Therefore, it is possible to prevent a situation in which the acquisition of the feature points fails, and despite receiving a reply indicating that the registration is needed from the user, the position cannot be registered. Thus, usability is improved. Since the verification process for the feature points of the parking position is started before inquiry of whether the registration is needed for the parking position to the user, it is possible to shorten a time from receiving the reply indicating that the registration is needed from the user to completion of the registration, and thus usability is improved.

(2) The control device according to (1), in which the registration processing unit is configured to inquire of the user whether the registration is needed when a parking at the parking position by the parking control is completed after the starting of the verification process.

According to (2), since the verification process for the feature points is performed even during the parking control of the moving body, it is possible to shorten a time from completion of the parking of the moving body to completion of the registration.

(3) The control device according to (1) or (2), in which the registration processing unit is configured to start the registration process when the number of the feature points is equal to or greater than a predetermined number.

According to (3), it is possible to accurately perform the verification process for the feature points based on feature points of which the number is equal to or greater than the predetermined number.

(4) The control device according to any one of (1) to (3), in which the verification process is a process of verifying position estimation of the moving body based on the feature points.

According to (4), information indicating that the position of the moving body can be estimated based on the feature points is necessary as information regarding the designated parking position to be designated.

(5) The control device according to (4), in which the registration processing unit is configured to inquire of the user whether the registration is needed when a position of the moving body can be estimated based on the feature points.

According to (5), when the position of the moving body can be estimated based on the feature points, whether the registration is needed is inquired of the user. Therefore, it is possible to prevent a situation in which the position estimation of the moving body fails, and despite receiving a reply indicating that the registration is needed from the user, the position cannot be registered. Thus, usability is improved.

(6) The control device according to any one of (1) to (5), in which the registration processing unit is configured to detect the feature points at a start point of the parking control.

According to (6), when the feature points can be acquired not during the parking control of the moving body but at the start point of the parking control, the registration process can be started from the detected time point. Therefore, it is possible to shorten a time from receiving a registration instruction from the user to completion of the registration.

(7) The control device according to any one of (1) to (6), in which when the user selects the parking position, the registration processing unit is configured to perform control to move the moving body so that the parking position is located within a predetermined range regarding the moving body.

According to (7), for example, by setting the predetermined range to a range in which the feature points of the parking position are easily detected, it is possible to accurately acquire the feature points of the parking position.

(8) The control device according to any one of (1) to (7), in which when the feature points cannot be acquired at a start point of the parking control, the registration processing unit is configured to start the registration process or configured not to perform the registration process after a parking at the parking position by the parking control is completed.

According to (8), when the feature points at the start point of the parking control cannot be acquired, it is possible to perform the registration process based on the feature points acquired after completion of the parking at the parking position.

(9) The control device according to any one of (1) to (8), in which when a reply indicating that the registration is not needed is received from the user in response to an inquiry of whether the registration is needed, the registration processing unit is configured to:

delete data regarding the registration process, maintain data regarding the registration process until a predetermined timing and inquires again whether the registration is needed, or output guide information related to the registration to the user.

According to (9), it is possible to effectively process data related to the registration process in response to a request from the user or according to a registration history of the user.

(10) A control method by a control device for a moving body, the control device including an outside recognition unit configured to acquire recognition data which is data of an outside of the moving body, a parking control unit configured to perform parking control to park the moving body at a parking position selected by a user of the moving body based on the recognition data, and a registration processing unit configured to register the parking position as a designated parking position, in which when the user selects the parking position, a processor of the control device is configured to:

detect feature points of the parking position;

start a registration process of registering the parking position as the designated parking position, including a verification process for the feature points when the feature point can be acquired;

inquire of the user whether a registration for the designated parking position is needed after starting of the verification process; and register the parking position as the designated parking position based on a reply to whether the registration is needed received from the user.

According to (10), when the feature points of the parking position can be acquired, whether the registration is needed for the parking position is inquired of the user. Therefore, it is possible to prevent a situation in which the acquisition of the feature points fails, and despite receiving a reply indicating that the registration is needed from the user, the position cannot be registered. Thus, usability is improved. Since the verification process for the feature points of the parking position is started before inquiry of whether the registration is needed for the parking position to the user, it is possible to shorten a time from receiving the reply indicating that the registration is needed from the user to completion of the registration, and thus usability is improved.

(11) A control program by a control device for a moving body, the control device including an outside recognition unit configured to acquire recognition data which is data of an outside of the moving body, a parking control unit configured to perform parking control to park the moving body at a parking position selected by a user of the moving body based on the recognition data, and a registration processing unit configured to register the parking position as a designated parking position, in which when the user selects the parking position, the control program causes a processor of the control device to execute processing of:

detecting feature points of the parking position;

starting a registration process of registering the parking position as the designated parking position, including a verification process for the feature points when the feature point can be acquired;

inquiring of the user whether a registration for the designated parking position is needed after starting of the verification process; and registering the parking position as the designated parking position based on a reply to whether the registration is needed received from the user.

According to (11), when the feature points of the parking position can be acquired, whether the registration is needed for the parking position is inquired of the user. Therefore, it is possible to prevent a situation in which the acquisition of the feature points fails, and despite receiving a reply indicating that the registration is needed from the user, the position cannot be registered. Thus, usability is improved. Since the verification process for the feature points of the parking position is started before inquiry of whether the registration is needed for the parking position to the user, it is possible to shorten a time from receiving the reply indicating that the registration is needed from the user to completion of the registration, and thus usability is improved.

What is claimed is:

1. A control device for a moving body, the control device comprising a processor configured to:

acquire recognition data which is a data of an outside of the moving body;

perform parking control to park the moving body at a parking position selected by a user of the moving body based on the recognition data; and register the parking position as a designated parking position, wherein:

when the user selects the parking position, the processor is configured to:

detect feature points of the parking position;

start a registration process of registering the parking position as the designated parking position, including a verification process for the feature points when the feature point can be acquired;

control an associated display device of the moving body to inquire of the user whether a registration for the designated parking position is needed after starting of the verification process;

register the parking position as the designated parking position based on a reply to whether the registration is needed received from the user; and perform control to move the moving body so that the parking position is located within a predetermined range regarding the moving body.

2. The control device according to claim 1, wherein the processor is configured to control the associated display device of the moving body to inquire of the user whether the registration is needed when a parking at the parking position by the parking control is completed after the starting of the verification process.

3. The control device according to claim 1, wherein the processor is configured to start the registration process when the number of the feature points is equal to or greater than a predetermined number.

4. The control device according to claim 1, wherein the verification process is a process of verifying position estimation of the moving body based on the feature points.

5. The control device according to claim 4, wherein the processor is configured to control the associated display device of the moving body to inquire of the user whether the registration is needed when a position of the moving body can be estimated based on the feature points.

6. The control device according to claim 1, wherein the processor is configured to detect the feature points at a start point of the parking control.

7. The control device according to claim 1, wherein when the feature points cannot be acquired at a start point of the parking control, the processor is configured to start the registration process or configured not to perform the registration process after a parking at the parking position by the parking control is completed.

8. The control device according to claim 1, wherein when a reply indicating that the registration is not needed is received from the user in response to an inquiry of whether the registration is needed, the processor is configured to:

delete data regarding the registration process, maintain data regarding the registration process until a predetermined timing and control the associated display device of the moving body to inquire again whether the registration is needed, or output guide information related to the registration to the user.

9. A control method by a control device for a moving body, the control device including a processor configured to acquire recognition data which is data of an outside of the moving body, perform parking control to park the moving body at a parking position selected by a user of the moving body based on the recognition data, and register the parking position as a designated parking position, wherein when the user selects the parking position, the processor of the control device:

detects feature points of the parking position;

starts a registration process of registering the parking position as the designated parking position, including a verification process for the feature points when the feature point can be acquired;

controls an associated display device of the moving body to inquire of the user whether a registration for the designated parking position is needed after starting of the verification process;

registers the parking position as the designated parking position based on a reply to whether the registration is needed received from the user; and performs control of the moving body so that the parking position is located within a predetermined range regarding the moving body.

10. A non-transitory computer-readable storage medium storing a control program by a control device for a moving body, the control device including a processor configured to acquire recognition data which is data of an outside of the moving body, perform parking control to park the moving body at a parking position selected by a user of the moving body based on the recognition data, and register the parking position as a designated parking position, wherein when the user selects the parking position, the control program causes the processor of the control device to execute processing of:

detecting feature points of the parking position;

starting a registration process of registering the parking position as the designated parking position, including a verification process for the feature points when the feature point can be acquired;

inquiring of the user whether a registration for the designated parking position is needed after starting of the verification process;

registering the parking position as the designated parking position based on a reply to whether the registration is needed received from the user; and performing control to move the moving body so that the parking position is located within a predetermined range regarding the moving body.

11. A control device for a moving body, the control device comprising a processor configured to:

acquire recognition data which is a data of an outside of the moving body;

perform parking control to park the moving body at a parking position selected by a user of the moving body based on the recognition data; and register the parking position as a designated parking position, wherein:

when the user selects the parking position, the processor is configured to:

detect feature points of the parking position;

start a registration process of registering the parking position as the designated parking position, including a verification process for the feature points when the feature point can be acquired;

inquire of the user whether a registration for the designated parking position is needed after starting of the verification process; and register the parking position as the designated parking position based on a reply to whether the registration is needed received from the user, and when the feature points cannot be acquired at a start point of the parking control, the processor is configured to start the registration process or configured not to perform the registration process after a parking at the parking position by the parking control is completed.

* * * * *